United States Patent
Mori et al.

(10) Patent No.: US 10,861,304 B2
(45) Date of Patent: *Dec. 8, 2020

(54) MONITORING CAMERA AND MONITORING CAMERA CONTROL METHOD

(71) Applicant: PANASONIC I-PRO SENSING SOLUTIONS CO., LTD., Fukuoka (JP)

(72) Inventors: Yuichiro Mori, Fukuoka (JP); Yasuji Nakamura, Fukuoka (JP); Kazutaka Higuchi, Osaka (JP); Satoru Ooyabu, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,010

(22) Filed: Sep. 27, 2019

(65) Prior Publication Data
US 2020/0027325 A1    Jan. 23, 2020

Related U.S. Application Data

(63) Continuation of application No. 15/848,287, filed on Dec. 20, 2017, now Pat. No. 10,475,312, which is a
(Continued)

(30) Foreign Application Priority Data

Feb. 14, 2007    (JP) .................................. 2007-033786

(51) Int. Cl.
*G08B 13/196*    (2006.01)
*G06K 9/00*    (2006.01)
(Continued)

(52) U.S. Cl.
CPC ..... *G08B 13/1963* (2013.01); *G06K 9/00771* (2013.01); *G08B 13/196* (2013.01);
(Continued)

(58) Field of Classification Search
None
See application file for complete search history.

(56) References Cited

U.S. PATENT DOCUMENTS 5,097,328 A    3/1992 Boyette
5,465,115 A    11/1995 Conrad et al.
(Continued)

FOREIGN PATENT DOCUMENTS

EP    1189187 A2    3/2002
GB    2411229 A    8/2005
(Continued)

OTHER PUBLICATIONS

Japanese Office Action for Application No. 2007-033786 dated Jan. 26, 2009.
(Continued)

*Primary Examiner* — David N Werner
(74) *Attorney, Agent, or Firm* — Pearne & Gordon LLP

(57) ABSTRACT

An image signal processing DSP subjects an image captured by an imaging element having a zoom lens to image processing for identifying a tracking target. In accordance with zoom information generated by the image signal processing DSP, the main CPU controls the zoom lens and controls a turn table that moves the imaging element in panning and tilting directions in accordance with pan and tilt information, to track the tracking target. During tracking of the tracking target, a determination is made, from information about movements of the tracking target generated by the image signal processing DSP, as to whether or not the target to be tracked has intruded the inside of the area from the outside.
(Continued)

In a case where the target has intruded the inside of a preset area from the outside, an alarm command is produced when the target continually remains in the area for; e.g., one second.

20 Claims, 5 Drawing Sheets

Related U.S. Application Data continuation of application No. 15/227,455, filed on Aug. 3, 2016, now Pat. No. 9,870,685, which is a continuation of application No. 15/018,604, filed on Feb. 8, 2016, now Pat. No. 9,437,089, which is a continuation of application No. 12/524,656, filed as application No. PCT/JP2008/000206 on Feb. 12, 2008, now Pat. No. 9,286,775.

(51) Int. Cl.
   *H04N 5/232* (2006.01)
   *H04N 5/14* (2006.01)
   *H04N 7/18* (2006.01)

(52) U.S. Cl.
   CPC . *G08B 13/19602* (2013.01); *G08B 13/19606* (2013.01); *G08B 13/19608* (2013.01); *G08B 13/19613* (2013.01); *G08B 13/19652* (2013.01); *G08B 13/19689* (2013.01); *H04N 5/144* (2013.01); *H04N 5/23203* (2013.01); *H04N 5/23216* (2013.01); *H04N 5/23296* (2013.01); *H04N 7/188* (2013.01); *H04N 7/18* (2013.01)

(56) References Cited

U.S. PATENT DOCUMENTS

| | | | |
|---|---|---|---|
| 5,953,055 A | 9/1999 | Huang et al. | |
| 5,973,732 A | 10/1999 | Guthrie | |
| 6,154,133 A | 11/2000 | Ross et al. | |
| 6,696,945 B1 | 2/2004 | Venetianer et al. | |
| 6,829,371 B1 | 12/2004 | Nichani et al. | |
| 6,931,146 B2 | 8/2005 | Aoki et al. | |
| 7,167,576 B2 | 1/2007 | Steenburgh et al. | |
| 7,200,246 B2 | 4/2007 | Cofer et al. | |
| 7,260,241 B2 | 8/2007 | Fukuhara et al. | |
| 7,529,646 B2 | 5/2009 | Lin et al. | |
| 7,710,455 B2 | 5/2010 | Aramaki et al. | |
| 8,184,003 B1 | 5/2012 | Nichols et al. | |
| 9,286,775 B2 * | 3/2016 | Mori | G08B 13/196 |
| 9,437,089 B2 * | 9/2016 | Mori | G08B 13/19608 |
| 9,870,685 B2 | 1/2018 | Mori et al. | |
| 2002/0015094 A1 | 2/2002 | Kuwano et al. | |
| 2002/0070133 A1 | 6/2002 | Lackman et al. | |
| 2002/0167403 A1 | 11/2002 | Colmenarez et al. | |
| 2003/0081130 A1 | 5/2003 | Cho | |
| 2003/0107650 A1 | 6/2003 | Colmenarez et al. | |
| 2003/0202101 A1 * | 10/2003 | Monroe | G08B 13/19689 348/156 |
| 2004/0071321 A1 | 4/2004 | Watkins et al. | |
| 2004/0179729 A1 | 9/2004 | Imai et al. | |
| 2004/0223056 A1 | 11/2004 | Norris, Jr. | |
| 2005/0018879 A1 | 1/2005 | Ito et al. | |
| 2005/0086704 A1 | 4/2005 | Rhodes et al. | |
| 2005/0105765 A1 | 5/2005 | Han et al. | |
| 2006/0072014 A1 | 4/2006 | Geng et al. | |

FOREIGN PATENT DOCUMENTS

| | | |
|---|---|---|
| JP | 05-014891 A | 1/1993 |
| JP | 06-347220 A | 12/1994 |
| JP | H07-021386 A | 1/1995 |
| JP | 2005-033827 A | 2/2005 |
| JP | 2005-117288 A | 4/2005 |
| JP | 2007-013814 A | 1/2007 |
| JP | 2007-048249 A | 2/2007 |
| WO | 00/08856 A1 | 2/2000 |

OTHER PUBLICATIONS

Japanese Office Action for Application No. 2007-033786 dated Oct. 8, 2008.
European Office Action for Application No. 08 710 360.2-2215 dated May 29, 2012.
International Search Report for Application No. PCT/JP2008/000206 dated May 20, 2008.
Navneet Dalal, et al., "Human Detection Using Oriented Histograms of Flow and Appearance", 3952 Lecture Notes in Computer Science 428-441 (2006).
Kazuya Sato, et al. "Suspicious Individual Detection Technique", Human Search Technology for Surveillance Video, vol. 78, No. 8 dated Aug. 25, 2004.
Shuichi Kasahara, "Making the Most Use of Artificial Intelligence Type Image Analyzing Technique" Times Change!—Security Show 2006, vol. 17, No. 3 dated Mar. 1, 2006.
Supplemental European Search Report for Application No. EP 08 71 0360 dated Apr. 7, 2011.

* cited by examiner

NO ALARM IS ISSUED

NO ALARM IS ISSUED

ALARM IS ISSUED

ALARM IS ISSUED

MONITORING CAMERA AND MONITORING CAMERA CONTROL METHOD

CROSS-REFERENCE TO RELATED APPLICATIONS

This is a Continuation of U.S. patent application Ser. No. 15/848,287 filed Dec. 20, 2017, which is a Continuation of U.S. patent application Ser. No. 15/227,455 filed Aug. 3, 2016, which is a Continuation of U.S. patent application Ser. No. 15/018,604 filed Feb. 8, 2016, which is a Continuation of U.S. patent application Ser. No. 12/524,656 filed Jul. 27, 2009, which is the national phase of PCT Application No. PCT/JP2008/000206 filed Feb. 12, 2008, which claims priority from Japanese Patent Application No. 2007-033786 filed Feb. 14, 2007. The contents of all of these applications are incorporated by reference herein in their entireties.

TECHNICAL FIELD

The present invention relates to a monitoring camera equipped with a function of performing image processing for identifying a tracking target as well as to a monitoring camera control method.

BACKGROUND ART

Monitoring camera hitherto include monitoring cameras having a function of generating an alarm by utilization of a difference among movements of a subject captured by means of stationary camera that perform neither panning nor tilting and cameras having a function of generating an alarm when the motion of a subject is not oriented in a given direction. Further, some monitoring cameras have a function of generating an alarm when a subject has approached a prohibited area by combining images captured by a plurality of stationary cameras that perform neither panning nor tilting. Patent Document 1 discloses that three-dimensional coordinates of a power transmission line, a steel tower, or a truck crane are determined by processing images captured by a plurality of stationary cameras; that a dangerous area is set around the power transmission line; and that, when the truck crane enters the dangerous area, an alarm is produced by monitoring a location of the truck crane.

Patent Document 1: JP-A-6-347220

DISCLOSURE OF THE INVENTION

Problem that the Invention is to Solve

However, the related-art monitoring cameras encounter the following drawbacks.

(1) When an alarm is produced by utilization of a difference among movements of a subject, the camera is effective for monitoring an imaging site that is free of motion or where there are small movements. However, when the camera is used for monitoring an imaging site where there are many movements, erroneous alarms are frequently produced; therefore, the camera is not usable. As mentioned above, depending on a monitored site, an increase in the number of times an alarm is produced is not preferable for a supervisor who is performing monitoring operation in terms of working efficiency. Conceivable imaging sites where there occur many movements include; for instance, a site where there is reflection from a road surface, a site where swaying actions of wood occur, a site where blinking of a computer display (monitor) occurs, a site where flickering of a fluorescent lamp occurs, and the like.

(2) In a case where images of a plurality of stationary cameras are combined together and when an alarm is produced in response to entry of a subject into a prohibited area, if a motion difference stemming from videos exists in the camera monitoring the area, an alarm will be produced even when a subject has not entered the area from the outside. FIG. 5 shows a case where two stationary cameras are installed. In an illustrated example, an area monitored by a camera 100 is taken as "A," and an area monitored by a camera 110 is taken as "B" (a relationship of magnitude is A>B). When a subject 120 enters the area B from the area A, an alarm is to be produced. However, even when the subject 120 is in the area B from the beginning and subsequently makes a movement in the area B, an alarm is produced. Namely, the areas A and B can freely be set; hence, if a subject (a person) is incidentally in the area B when the area B is set, an alarm will be produced in response to movement of the subject.

(3) Equipment that combines images with each other by use of a plurality of stationary cameras (video combination equipment) is required, which adds to the cost of a system. Moreover, it is impossible to accurately detect entry of a subject into an area from the outside unless positional information about respective stationary cameras is accurately transmitted to the image combination equipment. Specifically, high-precision installation of respective stationary cameras is required, and installation entails consumption of efforts and time.

The present invention has been conceived in light of the circumstance and aims at providing a monitoring camera that does not produce an alarm even when a subject makes a movement within a set area and that enables curtailing of system cost, as well as providing a monitoring camera control method.

Means for Solving the Problem

A monitoring camera of the present invention comprises: imaging means having a zoom lens; a turn table that moves the imaging means in panning and tilting directions; image processing means that subjects an image captured by the imaging means to image processing for identifying a tracking target, to thus generate tracking information including information about motion of the tracking target and pan, tilt, and zoom information; tracking mans that tracks the tracking target by controlling the zoom lens of the imaging means in accordance with the zoom information generated by the image processing means and controlling the turn table in accordance with the pan and tilt information generated by the image processing means; and intrusion detection means that determines, from information about motion of the tracking target generated by the image processing means, whether or not the tracking target has intruded inside of a preset area from outside, during the course of tracking the tracking target, and that outputs an alarm only when the tracking target has intruded the inside of the area from the outside.

According to the configuration, only when the tracking target has intruded the inside of the area from the outside, an alarm command is generated. Accordingly, no alarm command is produced even when there are movements of a subject in the area (e.g., reflection from a road surface, swaying actions of wood, blinking of a computer display, flicking of a fluorescent lamp, and the like). Further, the monitoring camera has imaging means having a zoom lens, a turn table for moving the imaging means in panning and tilting directions, and tracking means for tracking the tracking target. Therefore, precise adjustment of a location where a camera is to be installed, which has been difficult for a related-art stationary camera, can be performed accurately, readily. Namely, the degree of freedom of the location where the camera is to be installed can be enhanced. A plurality of cameras are not used, nor is required video combination equipment. Hence, system cost can be held down.

Further, in the monitoring camera of the present invention, in a case where the tracking target has intruded the inside of the area from the outside, the intrusion detection means outputs an alarm when the tracking target continually stays in the area for a predetermined period of time since the tracking target performed intrusion.

According to the configuration, influence of reflection from a road surface, swaying actions of wood, blinking of a computer display, flicking of a fluorescent lamp, and the like, can be eliminated substantially, completely. Accuracy of an alarm output can be increased.

In the monitoring camera of the present invention, the intrusion detection means does not output an alarm when tracking of the tracking target is started from the inside of the area and when the tracking target keeps moving in the area.

According to the configuration, even if a subject (a person) is incidentally located in an area when the area is set and when the subject has made a movement, no alarm is output.

A monitoring camera system of the present invention has at least two of any monitoring cameras, and tracks the tracking target in an associated manner by supplying an alarm signal from one camera directly to the other camera.

According to the configuration, at least two monitoring cameras operate in an associated manner; hence, the tracking target can be tracked without fail.

A monitoring camera control method of the present invention comprises: an image processing step of subjecting an image captured by imaging means having a zoom lens to image processing for identifying a tracking target, to thus generate tracking information including information about motion of the tracking target and pan, tilt, and zoom information; a tracking step of tracking the tracking target by controlling the zoom lens of the imaging means in accordance with the zoom information generated in the image processing step and controlling the turn table, which moves the imaging means in panning and tilting directions, in accordance with the pan and tilt information generated in the image processing step; and an intrusion detection step of determining, from the information about motion of the tracking target generated in the image processing step, whether or not the tracking target has intruded inside of a preset area from outside, during the course of tracking the tracking target, and that outputs an alarm only when the tracking target has intruded the inside of the area from the outside.

According to the method, only when the tracking target has intruded the inside of the area from the outside, an alarm command is generated. Accordingly, no alarm command is produced even when there are movements of a subject in the area (e.g., reflection from a road surface, swaying actions of wood, blinking of a computer display, flicking of a fluorescent lamp, and the like). Further, in a monitoring camera including imaging means having a zoom lens and a turn table for moving the imaging means in panning and tilting directions, the zoom of the camera is controlled, and the turn table is controlled, to thus move the camera in panning and tilting directions, thereby tracking the tracking target.

Hence, precise adjustment of a location where a camera is to be installed, which has been difficult for a related-art stationary camera, can be performed accurately, readily. Namely, the degree of freedom of the location where the camera is to be installed can be enhanced. A plurality of cameras are not used, nor is required video combination equipment. Hence, system cost can be held down.

Advantage of the Invention

According to the present invention, only when the tracking target has intruded the inside of the area from the outside, an alarm command is generated. Accordingly, no alarm command is produced even when there are movements of a subject in the area. Further, since the monitoring camera includes imaging means having a zoom lens, a turn table for moving the imaging means in panning and tilting directions, and tracking means for tracking the tracking target, precise adjustment of a location where a camera is to be installed, which has been difficult for a related-art stationary camera, can be performed accurately, readily. Namely, the degree of freedom of the location where the camera is to be installed can be enhanced. A plurality of cameras are not used, nor is required video combination equipment. Hence, system cost can be held down.

Figure 1:
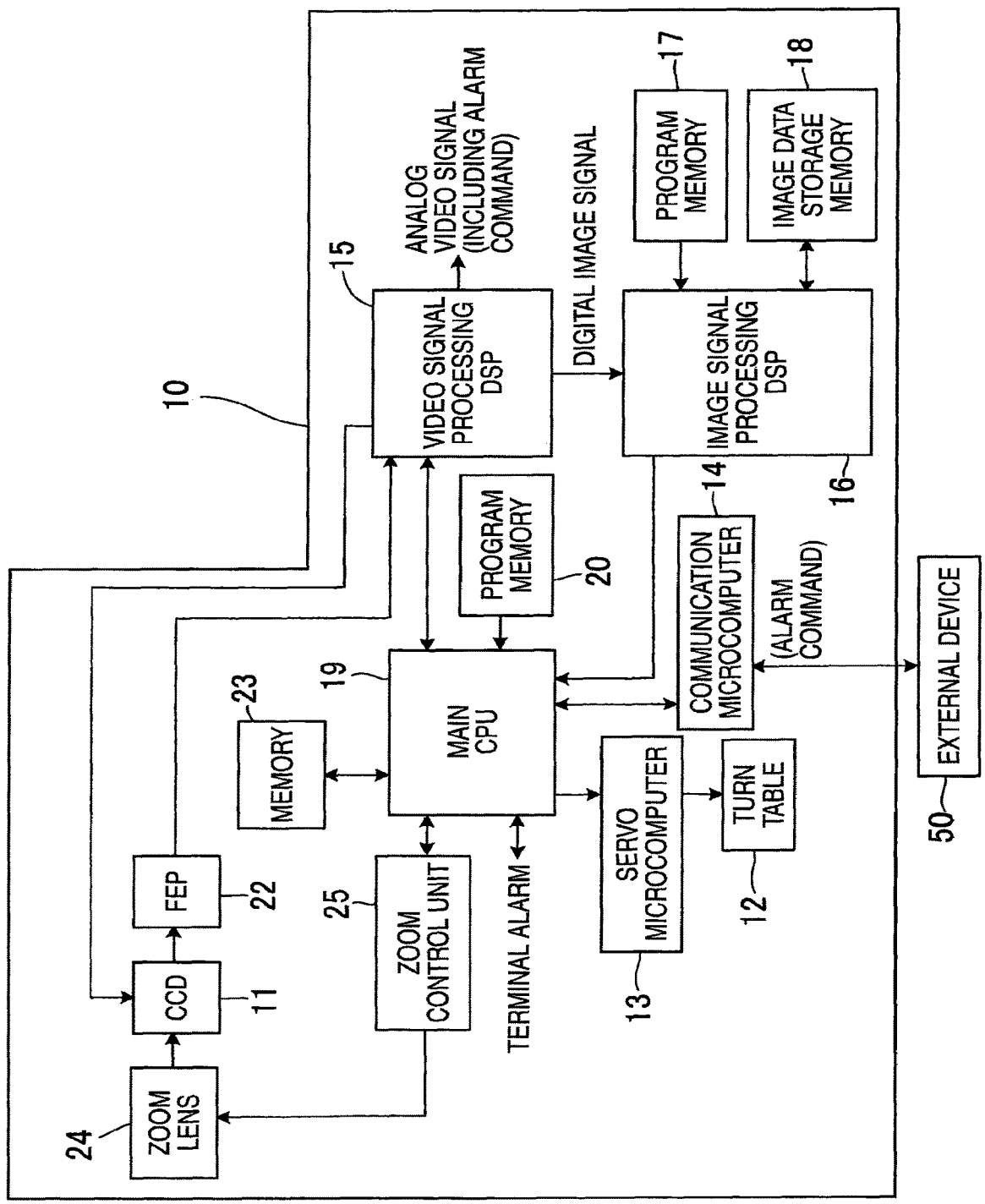
FIG. 1 is a block diagram showing a schematic configuration of a monitoring camera of an embodiment of the present invention.

DESCRIPTIONS OF THE REFERENCE NUMERALS 10, 10A, 10B MONITORING CAMERA
11 IMAGING ELEMENT
12 TURN TABLE
13 SERVO MICROCOMPUTER
14 COMMUNICATION MICROCOMPUTER
15 VIDEO SIGNAL PROCESSING DSP
16 IMAGE SIGNAL PROCESSING DSP
17, 20 PROGRAM MEMORY
18 IMAGE DATA STORAGE MEMORY
19 MAIN CPU
22 FEP
23 MEMORY
24 ZOOM LENS
25 ZOOM CONTROL UNIT
50 EXTERNAL DEVICE
60 RECORDER
70 MONITOR
80 BUILDING
90 CHARACTER
P TRACKING START POINT
C AREA
C1, C2 MONITORED AREA
C3 CORNER AREA

BEST MODE FOR IMPLEMENTING THE INVENTION

A preferred embodiment for implementing the present invention is hereunder described in detail by reference to the drawings.

FIG. 1 is a block diagram showing a schematic configuration of a monitoring camera of an embodiment of the present invention. In the drawing, a monitoring camera 10 of the present embodiment has an imaging element 11 for imaging a subject, such as a CCD (Charge-Coupled Device) and a CMOS (Complementary Metal Oxide Semiconductor); a front-end processor (hereinafter abbreviated as FEP) 22 that processes image information output from the imaging element 11 and converted into electric charges; a turn table 12 for orienting the imaging element 11 in a panning direction and a tilting direction; a servo microcomputer 13 that drives the turn table 12; a communication microcomputer 14 that exchanges a command with an external device 50; a video signal processing DSP (Digital Signal Processor) 15 that processes processing including activation of an electronic shutter, and the like, in response to a video signal from the FEP 22; an image signal processing DSP (Digital Signal Processor) 16 that identifies a tracking target by subjecting a digital image signal output from the video signal processing DSP 15 to binarization processing, noise reduction processing, and others; program memory 17 that stores a program for controlling the video signal processing DSP 16; image data storage memory 18 that stores image data processed by the image signal processing DSP 16; a main CPU (Central Processing Unit) 19 that controls individual sections of the camera; program memory 20 that stores a program for controlling the main CPU 19; and memory 23 that stores pan and tilt angle information and setting information about operations. A zoom lens 24 is attached to a front side of the imaging element 11, and the main CPU 19 controls the zoom lens 24, such as a zoom-in action, by way of a zoom control unit 25.

The image signal processing DSP 16 corresponds to image processing means. The main CPU 19 corresponds to tracking means and intrusion detection means. The zoom lens 24 and the imaging element 11 correspond to imaging means.

The imaging element 11 is mounted on the turn table 12, and the direction of the imaging element 11 can also be changed by rotating the turn table 12, so that a subject which a user desires to see can be photographed. The turn table 12 has a mechanism and a motor (omitted from the drawings) for moving the imaging element 11 in a panning direction and a tilting direction and is controlled by the servo microcomputer 13. Pan and tilt angle information is stored in the memory 23 along with a position number. The main CPU 19 can automatically rotate the turn table 12 through the pan and tilt angles stored along with the position number, so long as the user inputs a position number from a controller (not shown). The servo microcomputer 13 has a driver for driving the motor of the turn table 12 and a microcomputer for controlling the driver in compliance with a command from the main CPU 19. Nonvolatile memory, such as flash RAM (Random Access Memory), is used for the program memory 17 and 20. Volatile memory, such as RAM, is used for the image data storage memory 18.

The video signal processing DSP 15 processes a video signal from the camera 11; outputs an analogue video signal produced from the video signal; and outputs a digital image signal to the image signal processing DSP 16. The image signal processing DSP 16 captures the thus-delivered digital image signal every 100 ms, for instance, thereby determining a difference. Thus, tracking information including information about movements of the tracking target (a person) and pan, tilt, and zoom information is output as serial data to the main CPU 19. The image signal processing DSP 16 has three states; namely, a "wait state," a "search state," and a "tracking state," and notifies the main CPU 19 of which one of the states is a current state. The "wait state" is a state in which an automatic tracking capability is deactivated, and the "search state" is a state in which the automatic tracking capability is active and in which a moving subject is detected and in which pan, tilt, and zoom operations are controlled in such a way that the subject comes to the center, to thus determine whether or not the subject is a person. The "tracking state" is a state in which, after the person has been identified in the "search state," the person is actually tracked.

The main CPU 19 captures the video signal output from the imaging element 11 and transfers the thus-captured signal to the video signal processing DSP 15. The main CPU 19 also manages the position of an area set by the user and the position of the tracking target specified by the image signal processing DSP 16 by means of coordinates. When the tracking target is located by the image signal processing DSP 16, a tracking start position (a tracking start point) is recorded, and tracking is commenced. At this time, in accordance with the pan and tilt information input from the image signal processing DSP 16, the main CPU 19 controls the servo microcomputer 13; drives the turn table 12; and moves the imaging element 11 in the pan and tilt directions. Further, the main CPU 19 controls zooming action of the imaging element 11 in accordance with zoom information input by the image signal processing DSP 16.

The main CPU 19 also performs tracking operation in accordance with information about the motion of the tracking target input by the image signal processing DSP 16. Further, during the course of tracking operation, the main CPU determines whether or not the tracking target has intruded the inside of a preset area from the outside. When the tracking target has intruded the inside from the outside and when, for instance, one second has elapsed after a tracking point has entered the area, an alarm command is output. When the tracking start point remains inside the area and when tracking operation is incessantly performed within the area, the main CPU 19 does not output an alarm command. In addition to being output as an alarm signal (a terminal alarm: L active) directly to the terminal from the main CPU 19, the alarm command can be output by way of the video signal processing DSP 15 or by way of the communication microcomputer 14.

Figure 2A:
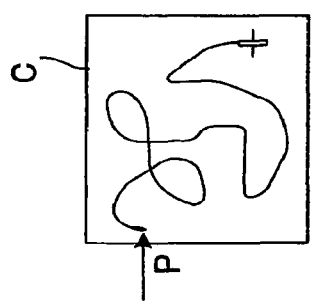
FIGS. 2A to 2D are views for describing a difference between a case where the monitoring camera shown in FIG. 1 produces an alarm and a case where no alarm is produced.
Figure 2B:
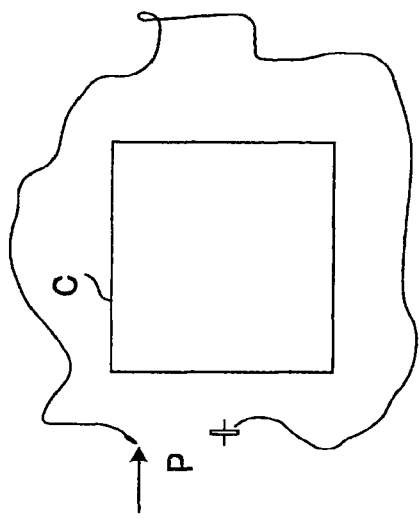
Figure 2C:
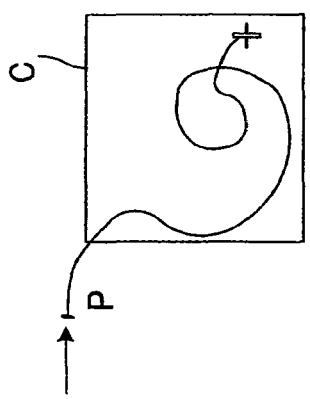
Figure 2D:
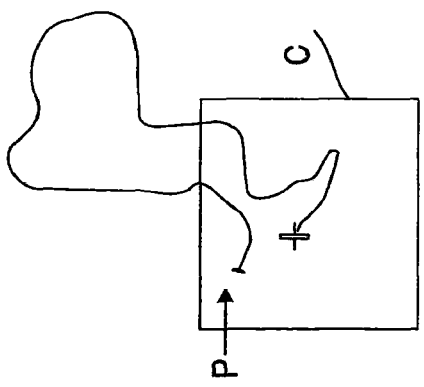

A difference between operation of the main CPU 19 performed when an alarm is produced and operation of the same performed when no alarm is produced is now described by reference to FIGS. 2A to 2D. FIGS. 2A and 2B show cases where no alarm is produced, and FIGS. 2C and 2D show cases where an alarm is produced. The case of FIG. 2A where no alarm is produced is a case where a tracking start point P is situated within an area C and where tracking operation is incessantly performed within the area C. The case of FIG. 2B where no alarm is produced is a case where the tracking start point P is situated outside of the area C and where tracking operation is incessantly performed outside of the area C. The case FIG. 2C where an alarm is produced is a case where the tracking start point P is situated outside of the area C and where the tracking start point P is situated outside of the area C and where a tracking target is now being tracked for; for example, one second, within the area C after having intruded the area C from the outside. The case of FIG. 2D where an alarm is produced is a case where the tracking start point P is situated within the area C and where the tracking target once exits the area C, again intrudes the inside of the area C, and is now being tracked for; e.g., one second, within the area C.

Figure 3:
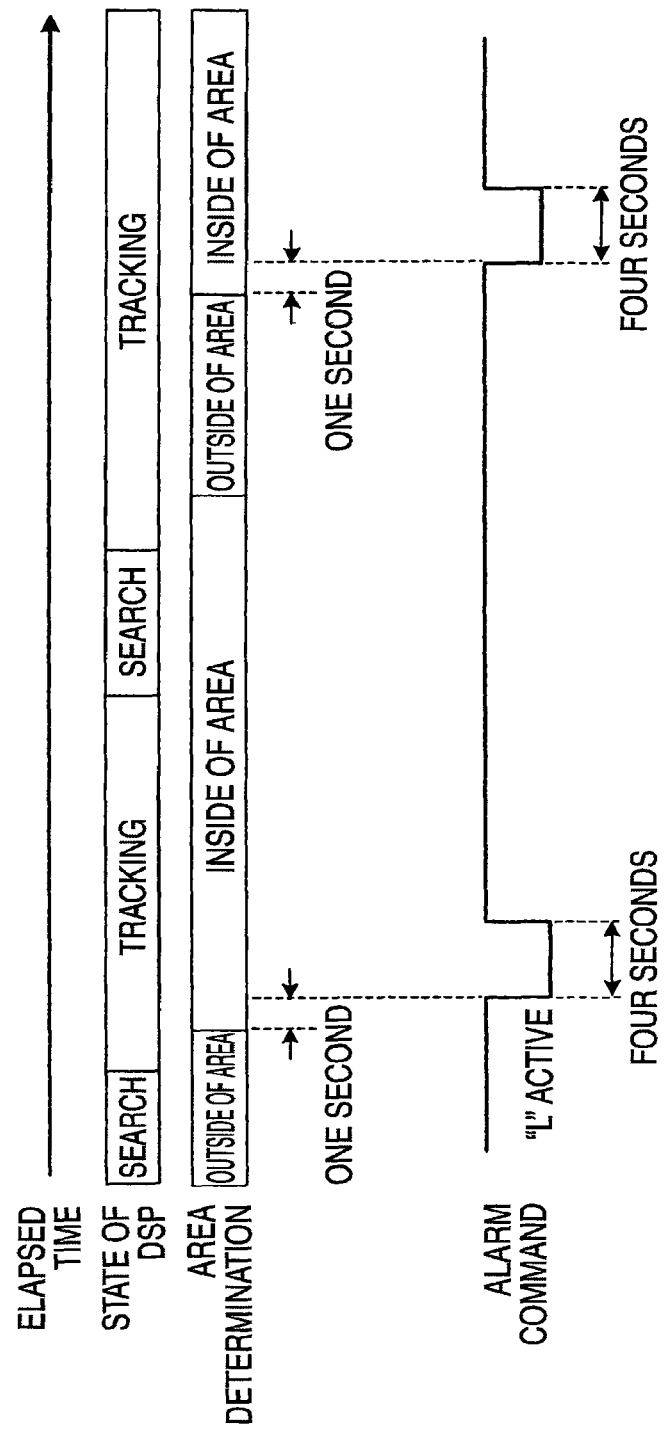
FIG. 3 is a timing chart for describing operation of the monitoring camera shown in FIG.

FIG. 3 is a timing chart showing the state of the image signal processing DSP 16 and operation of the main CPU 19. In the drawings, the image signal processing DSP 16 repeatedly enters a wait state, a search state, and a tracking state. The main CPU 19 determines, from the tracking information from the image signal processing DSP 16, whether a tracking target is situated outside or inside. When the target is determined to have intruded the area from the outside, an alarm command is output only for four seconds after a wait of; for instance, one second. Specifically, the alarm command output is brought into an "L" active state only for four seconds.

As mentioned above, according to the monitoring camera 10 of the present embodiment, the image signal processing DSP 16 subjects the image captured by the imaging element 11 having the zoom lens 24 to image processing for identifying the tracking target, and generates tracking information including information about movements of the tracking target and pan, tilt, and zoom information. In accordance with the zoom information generated by the image signal processing DSP 16, the main CPU 19 controls the zoom function of the imaging element 11. Further, in accordance with the pan and tilt information, the main CPU 19 controls the turn table 12 that moves the imaging element 11 in panning and tilting directions, thereby tracking the target. During the course of tracking the tracking target, the main CPU determines, from information about movements of the tracking target generated by the image signal processing DSP 16, whether or not the tracking target has intruded the inside of the preset area from the outside; and generates an alarm command when the target has intruded the area from the outside and continually stays in the area for one second. Namely, an alarm is produced.

Therefore, only when the tracking target has intruded the inside of the area from the outside, an alarm command is generated. Accordingly, no alarm command is produced even when there are movements of a subject in the area (e.g., reflection from a road surface, swaying actions of wood, blinking of a computer display, flicking of a fluorescent lamp, and the like). In particular, since a time lag; for instance, one second, from a point in time when the tracking target intruded the inside of an area from the outside is set as conditions for generating an alarm command, influence of movements of the subject can be eliminated substantially, completely. Further, in a case where tracking is initiated from the inside of the area, even if the tracking target keeps moving within the area, an alarm will not be produced. Therefore, even if a subject (a person) is incidentally in an area at the time of setting of the area, an alarm command responsive to motion of the subject will not be produced.

An alarm command is output when the tracking target has intruded the area. Hence, erroneous generation of an alarm command, which would otherwise be caused by swaying action of wood, is not produced even when wood is behind the set area, the degree of freedom of the location where the camera is installed can be enhanced. Since a plurality of cameras are not used and since video combination equipment is not required, system cost can be held down.

Figure 4:
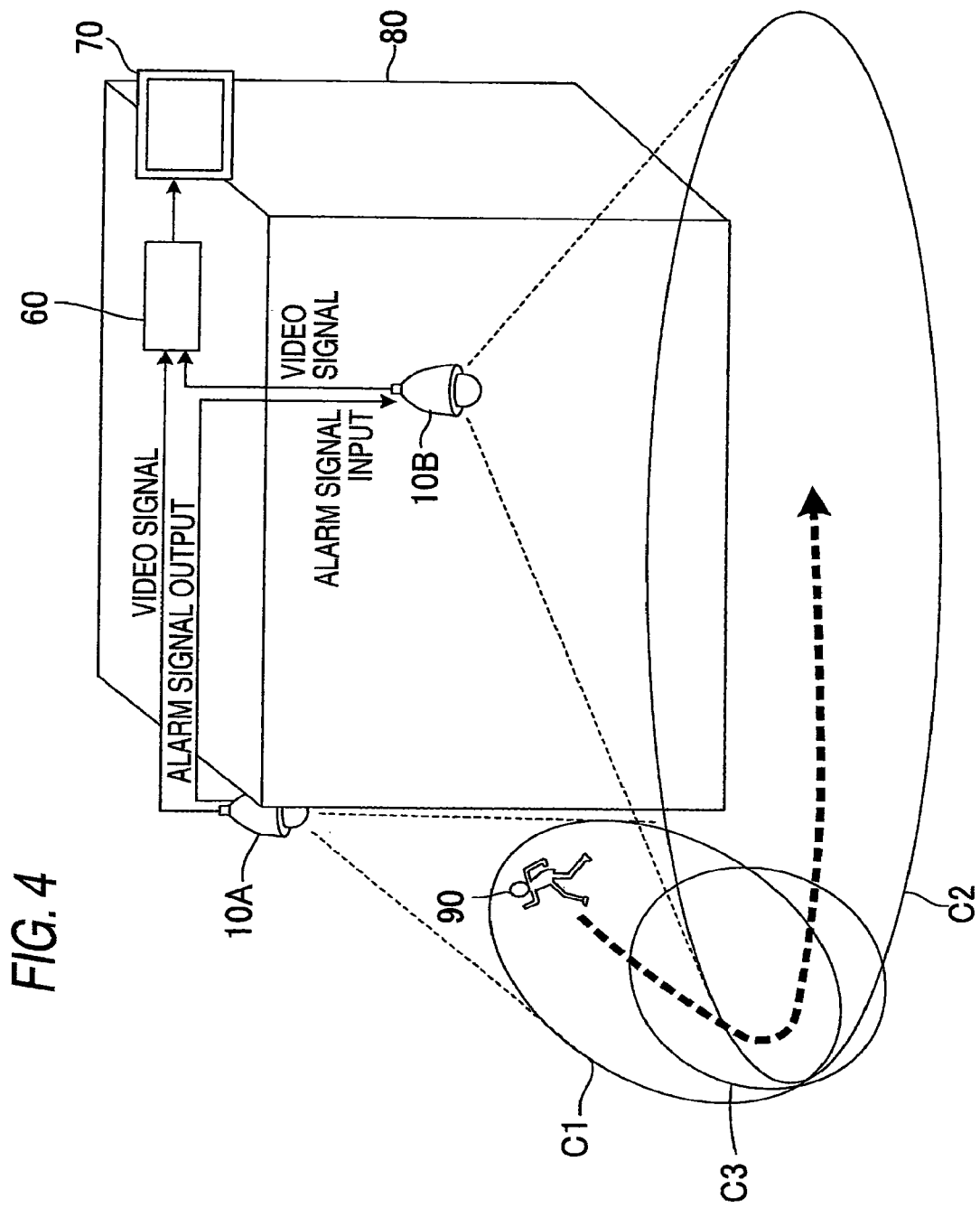
FIG. 4 is a block diagram showing a schematic configuration of a monitoring camera system equipped with the plurality of monitoring cameras shown in FIG. 1.
Figure 5:
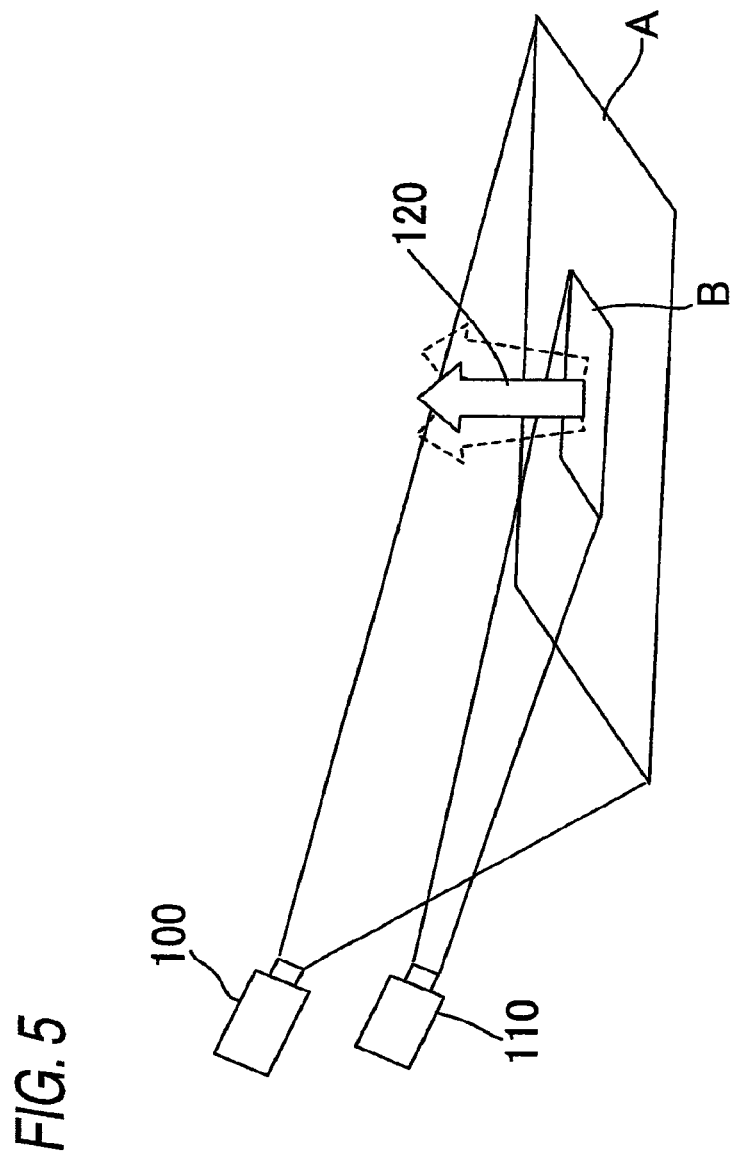
FIG. 5 is a view for describing drawbacks in a related-art monitoring camera.

A monitoring camera system using the monitoring camera of the present invention will now be described. FIG. 4 is a block diagram showing a schematic configuration of the monitoring camera system of the present embodiment. As shown in FIG. 4, the monitoring camera system of the present embodiment has two monitoring cameras 10A and 10B; a recorder 60 that records video signals output from the respective monitoring cameras 10A and 10B; and a monitor 70 that displays a video recorded by the recorder 60. In the present embodiment, the monitoring camera 10A is set on one side surface of a building 80, and the monitoring camera 10B is set on the front of the building 80. An area monitored by the monitoring camera 10A is C1, and an area monitored by the monitoring camera 10B is C2. In relation to the monitoring camera 10A, a corner area C3 of the building 80 is set as an alarm signal output area.

In the monitoring cameras 10A and 10B, when the tracking target is determined to have intruded the inside of the area from the outside as mentioned above, the main CPUs 19 output an alarm signal (a terminal alarm) directly to a terminal. The main CPUs 19 of the respective monitoring cameras 10A and 10B are arranged so as to be able to capture signals from the respective alarm terminals. Data are set in the memory 23 connected to the main CPUs 19 in such a way that, when signals are input to the alarm terminals of the respective main CPUs 19, the main CPUs 19 drive the respective turn tables 12 to panning and tilting angles corresponding to certain preset position numbers so as to enter a "search state." For instance, as shown in FIG. 4, the corner area C3 of the building 80 is set as an alarm signal output area in the monitoring camera 10A.

Meanwhile, the same corner area C3 is previously set as a preset position [1] in the monitoring camera 10B. When a signal is input to the alarm terminal, setting is made in such a way that the monitoring camera 10B is oriented to the preset position [1], to thus enter a "search state." The monitoring camera 10A is connected to the alarm terminal of the monitoring camera 10B in such a way that the alarm signal output from the monitoring camera 10A is input to the alarm terminal of the monitoring camera 10B.

As a result of the monitoring cameras 10A and 10B being set as mentioned above, when a person 90 tracked by the monitoring camera 10A has intruded the corner area C3 of the building 80, the main CPU 19 of the monitoring camera 10A outputs a terminal alarm, and the thus-output signal is input to the alarm terminal of the monitoring camera 10B. As a result of the alarm signal being input to the monitoring camera 10B, the monitoring camera 10B is oriented toward the preset position [1], to thus enter a "search state," identify the person 90 intruded the corner area C3 of the building 80, and track the person 90.

As mentioned above, the plurality of monitoring cameras 10 are previously set so as to perform associated operation, whereby the cameras can readily, automatically perform tracking operation. In particular, the monitoring cameras 10A and 10B located within a short range where they can capture the same area directly transmit signals without involvement of another equipment. Hence, the monitoring cameras 10A and 10B can quickly operate in an associated manner without regard to a situation, such as congestion of a network, a distant location where another equipment is installed, and the like. Tracking can be performed without losing the person 90.

Although the present invention has been described in detail and by reference to the specific embodiment, it is manifest to those skilled in the art that the present invention is susceptible to various alterations or modifications without departing the spirit and scope of the present invention.

The present patent application is based on Japanese Patent Application (JP-A-2007-033786) filed on Feb. 14, 2007, contents of which are incorporated herein for reference.

INDUSTRIAL APPLICABILITY

The present invention yields an advantage of not producing an alarm even when a subject has made a movement within a set area and being able to hold down system cost, and can be applied to a monitoring camera system, and the like.

The invention claimed is:

1. A monitoring system, comprising:
a camera that captures an image within a monitoring area; and
a processor configured to:
identify a tracking target in the image captured by the camera;
set a preset line within the monitoring area;
determine whether the tracking target crosses the preset line from outside the monitoring area; and
output an alarm only if the tracking target crosses the preset line from the outside.

2. The monitoring system according to claim 1, wherein the processor is further configured to determine whether the tracking target crosses the preset line from inside the monitoring area, wherein:
if the tracking target crosses the preset line from the inside of the monitoring area and the tracking target remains in the monitoring area, the processor does not output the alarm, and
if the tracking target crosses the preset line from the inside of the monitoring area and the tracking target moves to the outside of the monitoring area, the processor does not output the alarm.

3. The monitoring system according to claim 1, wherein the preset line comprises a curved line which defines a preset area having a circle shape.

4. The monitoring system according to claim 1, wherein the preset line comprises a plurality of straight lines which define a preset area.

5. The monitoring system according to claim 1, further comprising
an image processor that inputs a plurality of images captured by the camera, tracks a movement of the tracking target included in the plurality of images, and outputs information with respect to the movement of the tracking target to the processor, wherein
the image processor tracks the tracking target by moving the camera in accordance with the information with respect to the movement of the tracking target output by the image processor.

6. The monitoring system according to claim 5, further comprising
a zoom lens that is located in front of the camera, wherein
the image processor generates zoom information based on a plurality of input images captured by the camera, and
the processor controls a zoom process of the zoom lens in accordance with the zoom information.

7. The monitoring system according to claim 1, wherein:
the camera captures the image within the monitoring area in accordance with an initial imaging direction of the camera; and
when the tracking target crosses the preset line from a first side of the preset line to a second side of the preset line, the processor changes an imaging direction from the initial imaging direction to a second imaging direction toward the second side of the preset line and tracks the tracking target by moving the camera in a tilt direction or in a pan direction.

8. The monitoring system according to claim 7, wherein the processor changes the imaging direction by moving the camera in the tilt direction or in the pan direction such that the tracking target is positioned in a center of the image captured by the camera.

9. The monitoring system according to claim 7, further comprising
a camera apparatus that includes the camera, the processor and a receiver, wherein
the processor sets the imaging direction of the camera to be toward the second side of the preset line by rotating the camera in the tilt direction or in the pan direction when the receiver receives a signal transmitted from another apparatus different from the camera apparatus.

10. The monitoring system according to claim 7, further comprising
a memory that stores location information indicating a preset position positioned in the second side of the preset line, wherein
the processor sets the imaging direction of the camera according to the location information to be toward the preset position positioned in the second side of the preset line by moving the camera in the tilt direction or in the pan direction when the processor receives a predetermined input,
the processor further rotates the camera for tracking the tracking target in the tilt direction or in the pan direction according to the location information.

11. The monitoring system according to claim 7, wherein the processor rotates the camera for tracking the tracking target in the tilt direction or in the pan direction when the tracking target crosses the preset line from the first side of the preset line to the second side of the preset line.

12. The monitoring system according to claim 11, wherein the processor does not rotate the camera for tracking the tracking target in the tilt direction or in the pan direction when a first position where the moving subject is detected is in the second side of the preset line.

13. The monitoring system according to claim 11, wherein the processor rotates the camera for tracking the tracking target in the tilt direction or in the pan direction when the tracking target stops for a predetermined period.

14. The monitoring system according to claim 1, wherein the camera is configured to capture a plurality of images by rotating the camera, each of the captured plurality of images corresponding to each of partial areas of the monitoring area.

15. A monitoring camera, comprising:
an imager having a lens, the imager configured to capture an image within a monitoring area;
an image processor that identifies a tracking target in the image captured by the imager and generates tracking information;
a main processor; and
a memory storing instructions, that when executed by the main processor, cause the main processor to perform operations including:

setting a preset line within the monitoring area, determining, based on the tracking information generated by the image processor, whether the tracking target crosses the preset line from outside the monitoring area; and outputting an alarm only if the tracking target crosses the preset line from the outside.

16. A monitoring system comprising at least two monitoring cameras according to claim 15, wherein the tracking target is tracked in an associated manner by supporting an alarm signal from one camera directly to the other camera.

17. A monitoring method, comprising:

capturing, by a first camera, a first image within a first monitoring area;

identifying, by a processor, a tracking target in the first image captured by the first camera;

setting, by the processor, a preset line within the first monitoring area;

determining, by the processor, whether the tracking target crosses the preset line from outside the first monitoring area; and outputting, by the processor, an alarm only if the tracking target crosses the preset line from the outside.

18. The monitoring method according to claim 17, wherein:

the capturing, by the first camera, of the first image within the first monitoring area is in accordance with a first imaging direction of the first camera, and when the tracking target crosses the preset line from a first side of the preset line to a second side of the preset line, changing, by the processor, the first imaging direction to a second imaging direction toward the second side of the preset line and tracking the tracking target by moving the first camera in a tilt direction or in a pan direction.

19. The monitoring method according to claim 18, further comprising:

setting the first imaging direction of the first camera to be toward a preset position positioned in the second side of the preset line by rotating the first camera in the tilt direction or in the pan direction according to location information indicating the preset position positioned in the second side of the preset line and being stored in a memory, and moving the first camera for tracking the tracking target in the tilt direction or in the pan direction when detecting the tracking target in the second side of the preset line after setting the first imaging direction of the first camera according to the location information.

20. The monitoring method according to claim 18, further comprising:

capturing, by a second camera, a second image within a second imaging area that is determined in accordance with an imaging direction of the second camera and overlaps with a portion of the first monitoring area including the preset line;

transmitting an alarm to a first camera apparatus including the first camera when detecting the tracking target positioned in the second side of the preset line by a second camera apparatus including the second camera;

setting the first imaging direction of the first camera to be toward a preset position positioned in the second side of the preset line by rotating the first camera in the tilt direction or in the pan direction according to location information indicating the preset position positioned in the second side of the preset line and being stored in a memory when the alarm is transmitted to the first camera apparatus; and moving the first camera for tracking the tracking target in the tilt direction or in the pan direction when detecting the tracking target in the second side of the preset line after setting the first imaging direction of the first camera according to the location information.

* * * * *